(12) United States Patent
Milburn

(10) Patent No.: US 7,908,760 B2
(45) Date of Patent: Mar. 22, 2011

(54) VEHICLE DRIVE AXIS ALIGNMENT DEVICE

(75) Inventor: Kenneth Milburn, Wolverine Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/576,414

(22) Filed: Oct. 9, 2009

(65) Prior Publication Data
US 2010/0088909 A1    Apr. 15, 2010

Related U.S. Application Data

(60) Provisional application No. 61/104,099, filed on Oct. 9, 2008.

(51) Int. Cl.
*G01B 5/25* (2006.01)
(52) U.S. Cl. .................. 33/608; 33/365; 33/600
(58) Field of Classification Search .............. 33/335, 33/341, 365, 600, 608
See application file for complete search history.

(56) References Cited

U.S. PATENT DOCUMENTS

| | | | | |
|---|---|---|---|---|
| 2,176,214 | A | 10/1939 | Falge et al. | |
| 3,012,325 | A | 12/1961 | Elam | |
| 4,302,883 | A * | 12/1981 | MacGregor | 33/608 |
| 4,523,384 | A * | 6/1985 | Giacomini | 33/608 |
| 4,534,200 | A * | 8/1985 | Celette | 33/600 |
| 4,615,618 | A | 10/1986 | Bailey et al. | |
| 4,631,832 | A | 12/1986 | Schrammen et al. | |
| 4,691,443 | A | 9/1987 | Hamilton et al. | |
| 5,105,546 | A | 4/1992 | Weise et al. | |
| 5,390,421 | A * | 2/1995 | Richardson | 33/608 |
| 5,644,854 | A * | 7/1997 | Bergeron | 33/608 |
| 5,697,161 | A * | 12/1997 | Denley | 33/335 |
| 5,778,544 | A | 7/1998 | Pherigo | |
| 6,363,619 | B1 | 4/2002 | Schirmer et al. | |
| 6,675,488 | B2 * | 1/2004 | Duke | 33/600 |
| 6,823,601 | B2 | 11/2004 | Murray | |
| 6,886,266 | B2 * | 5/2005 | Kidd et al. | 33/608 |
| 2008/0201967 | A1 | 8/2008 | Knopik et al. | |

\* cited by examiner

*Primary Examiner* — G. Bradley Bennett
(74) *Attorney, Agent, or Firm* — Michael Best & Friedrich LLP

(57) ABSTRACT

An alignment device measures an angular offset between a vehicle body axis and a vehicle drive axis. The device includes an arm having a mounting portion for mounting to a vehicle such that the arm is aligned with the vehicle body axis. A wheel support member is coupled to the arm for rotation relative to the arm. A wheel is rotatably supported by the wheel support member and configured to roll on a ground surface, such that the wheel and the wheel support member are configured to self-align with the vehicle drive axis when the arm is mounted to the vehicle and the vehicle is driven on the ground surface. An indicator displays the angular offset between the wheel support member and the arm, which is indicative of the angular offset between the vehicle body axis and the vehicle drive axis. A method of carrying out a measurement with the device is also disclosed.

17 Claims, 3 Drawing Sheets

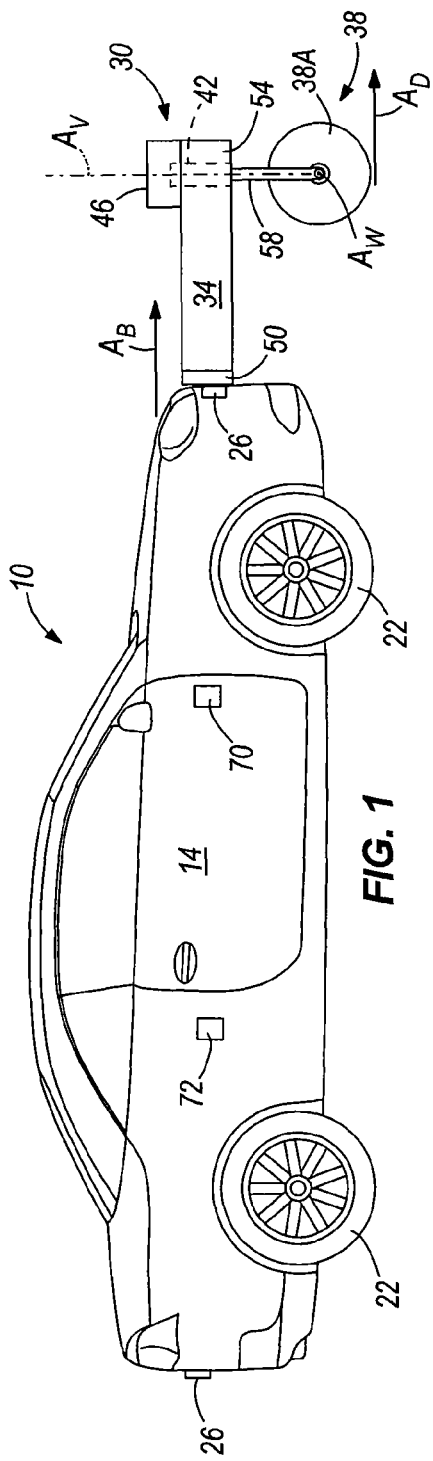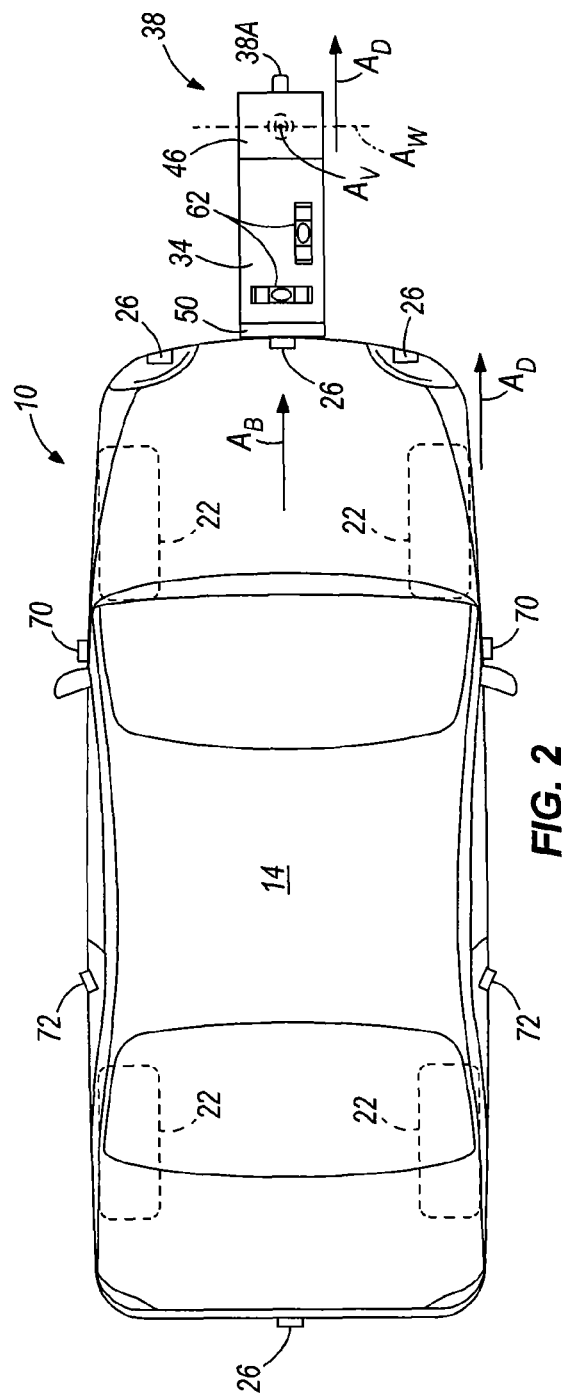

VEHICLE DRIVE AXIS ALIGNMENT DEVICE

CROSS-REFERENCE TO RELATED APPLICATIONS

This application claims priority to U.S. Provisional Patent Application No. 61/104,099, filed Oct. 9, 2008, the entire contents of which are hereby incorporated by reference.

BACKGROUND

The present invention relates to alignment devices for vehicles, and more particularly to a device operable to align vehicle-mounted devices with the drive axis of the vehicle.

Various devices on a vehicle are designed to be aligned to the vehicle's drive axis (both pointing in the forward drive direction and the rearward drive direction) in order to effectively point them in the proper direction for optimum performance. Such devices can include, but are not limited to, cameras, radar sensors, lidar sensors, and headlights. Previously, a large and expensive machine, sometimes referred to as a "rolls machine," present typically only at the vehicle assembly plant, was required to align these and other devices with the vehicle's drive axis. The machine lifts the vehicle on a set of powered rollers to allow the vehicle wheels to turn and to establish a natural drive path or drive axis while keeping the vehicle stationary. Once the drive axis has been determined, the devices are aligned to the drive axis at the assembly plant.

The known rolls machine is not typically available at dealerships and other service shops. Thus, optimum alignment of devices that need to be aligned to the vehicle's drive axis is a difficult task, often resulting in aligning the device to the vehicle's body axis, which due to tolerance stack-ups of vehicle components, can vary several degrees from the vehicle's drive axis. Such variation can cause a loss of performance and/or operation of these precision devices.

SUMMARY

In one embodiment, the invention provides an apparatus for measuring an angular offset between a vehicle body axis and a vehicle drive axis. The device includes an arm having a mounting portion for mounting to a vehicle such that the arm is aligned with the vehicle body axis defined by a body of the vehicle. A wheel support member is coupled to the arm for rotation relative to the arm. A wheel is rotatably supported by the wheel support member and configured to roll on a ground surface, such that the wheel and the wheel support member are configured to self-align with the vehicle drive axis when the arm is mounted to the vehicle and the vehicle is driven on the ground surface. An indicator displays the angular offset between the wheel support member and the arm, which is indicative of the angular offset between the vehicle body axis and the vehicle drive axis.

In another embodiment, the invention provides a method of measuring an angular offset between a vehicle body axis and a vehicle drive axis. An arm is coupled to a vehicle such that the arm is aligned with the vehicle body axis defined by a body of the vehicle. A wheel support member is supported with the arm for rotation relative to the arm. A wheel is rotatably supported with the wheel support member with the wheel in contact with a ground surface. The vehicle is driven on the ground surface along the vehicle drive axis, such that the wheel and the wheel support member self-align with the vehicle drive axis. The angular offset between the wheel support member and the arm, which is indicative of the angular offset between the vehicle body axis and the vehicle drive axis, is displayed by an indicator.

Other aspects of the invention will become apparent by consideration of the detailed description and accompanying drawings.

BRIEF DESCRIPTION OF THE DRAWINGS

FIG. 1 is a side view of a vehicle drive axis alignment device according to one aspect of the invention, mounted on a vehicle.

FIG. 2 is a top view of the vehicle drive axis alignment device of FIG. 1

DETAILED DESCRIPTION

Figure 3:
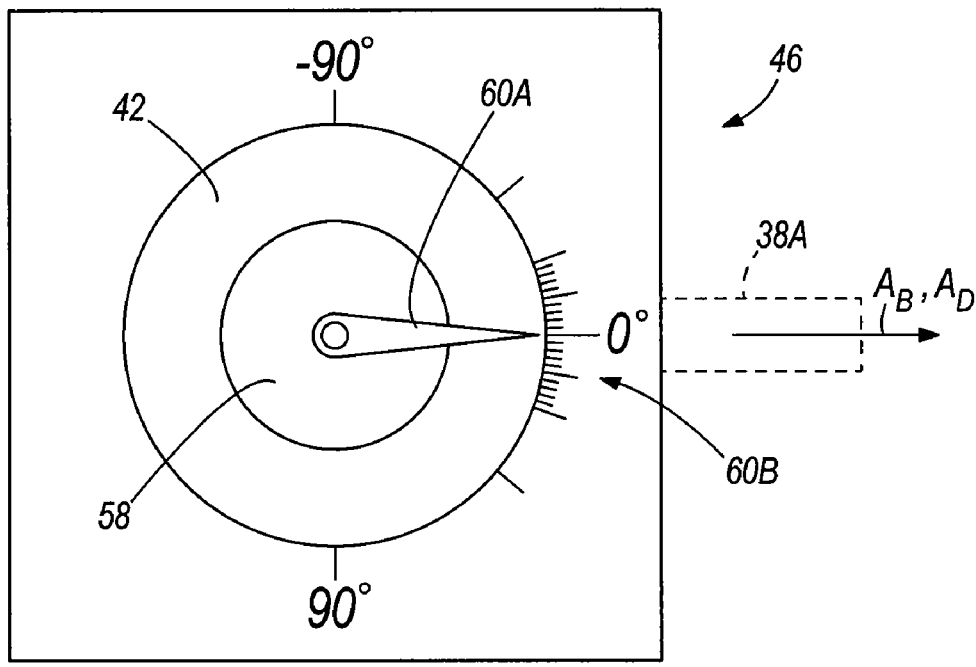
FIG. 3 is a top view of an angle box of the vehicle drive axis alignment device of FIG. 1, the angle box indicating no offset between vehicle body and vehicle drive axes.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

A vehicle 10 includes a body 14 and a plurality of wheels 22 and/or other means of contacting the ground to guide the vehicle 10 and define a drive axis $A_D$ of the vehicle 10. While the vehicle 10 of the illustrated construction is an automobile, the invention can be used or adapted for use on other types of vehicles as well. In addition to automobiles, the invention is useful on any vehicle including one or more precision devices or components that depend on alignment with the drive axis $A_D$ for proper operation. Such alternative vehicles include, but are not limited to, motorcycles, recreational off-road vehicles such as ATV's and snowmobiles, aircraft, etc.

After the body 14 and the chassis (which carries the wheels 22) are joined together during manufacture of the vehicle 10, an axis $A_B$ of the vehicle body 14 can be offset from the drive axis $A_D$ of the vehicle 10 due to tolerance stack-up of vehicle components. Even a slight offset angle (e.g., 3 degrees) between the body axis $A_B$ and the drive axis $A_D$ can cause a loss of performance and/or operation of various devices 26 that must be aligned with the drive axis $A_D$ for precision but are physically associated (coupled directly or indirectly) with the body 14. The body-mounted devices 26 may include, but are not limited to, cameras, radar sensors, lidar sensors, and headlights. In order to align one or more of the body-mounted devices 26 with the drive axis $A_D$, an apparatus and method are provided to measure the actual offset angle between the body axis $A_B$ and the drive axis $A_D$ and then calibrate or adjust the one or more body-mounted devices 26 accordingly, to be aligned with the drive axis $A_D$.

As shown in FIGS. 1 and 2, a vehicle drive axis alignment device 30 is provided to determine the offset between the body axis $A_B$ and the drive axis $A_D$. The alignment device 30 includes a fixture such as an arm 34 that is configured to be coupled to the body 14. As described in further detail below, the alignment device 30 further includes a wheel assembly 38

(including a wheel 38A), a swivel mount 42, and an angle box 46. The arm 34 includes a first portion 50 for mounting the alignment device 30 to the vehicle body 14 (and coaxial therewith) and a second portion 54 for rotatably mounting the wheel assembly 38 relative to the arm 34 with the swivel mount 42. A wheel support member, which is a fork 58 in the illustrated construction, extends down from the swivel mount 42 and supports the wheel 38A for rotation relative to the fork 58.

The wheel 38A and the fork 58 constitute the wheel assembly 38 that is rotatably supported by the arm 34 so that it can swivel about an axis $A_V$ relative to the arm 34, the axis $A_V$ being substantially vertical when the arm 34 is coupled to the vehicle 10 as shown in the drawings. The wheel 38A is rotatable about a wheel axis $A_W$ that is substantially horizontal (i.e., substantially perpendicular to the vertical axis $A_V$). Although the wheel support member is illustrated as a fork 58, alternate structures for supporting the wheel 38A for rotation on the ground are optional. For example, a wheel support member can include a member that supports the wheel 38A from only one side (i.e., cantilever supported). Furthermore, the wheel assembly 38 can include more than one wheel 38A, and the wheel support member can extend at least one of between and around multiple parallel wheels 38A to rotatably support the wheels 38A. The swivel mount 42 can take many different forms and can include one or more roller bearings, a caster, one or more lubricated or non-lubricated bushings, etc. Regardless of the type of physical structure selected, the swivel mount 42 couples the wheel assembly 38 to the arm 34 so that the wheel assembly 38 can swivel about the axis $A_V$ to self-align with the drive axis $A_D$ as described below.

The angle box 46 is configured to measure and output a signal indicative of a net angle between the arm 34 and the fork 58. The net angle between the arm 34 and the fork 58 is indicative of the offset angle between the body axis $A_B$ and the drive axis $A_D$. The angle box 46 is configured to measure and output an angle of zero degrees when the wheel 38A of the alignment device 30 is coaxial with the arm 34, and thereby, with the body axis $A_B$.

The arm 34 or the angle box 46 can be provided with a pair of single-axis spirit levels 62 as shown in FIG. 2 to ensure that the wheel 38A is arranged squarely to the ground with the arm 34 substantially parallel to the ground and the fork 58 substantially perpendicular to the ground when the alignment device 30 is mounted to the body 14. The first portion 50 of the arm 34 may include adjustable coupling means providing fine adjustment to correct any deviance observed with the levels 62. As an alternative, a single dual-axis spirit level or one or more electronic devices may replace the pair of single-axis levels 62.

With the alignment device 30 mounted to the body 14, the vehicle 10 is driven on the ground with a neutral or central steering angle such that the drive axis $A_D$ along which the vehicle 10, including the body 14, moves is also neutral or central (although the body 14 may not be aligned). The wheel 38A of the alignment device 30 is in contact with the ground as the vehicle 10 moves along the drive axis $A_D$, and the wheel assembly 38 self-centers itself so that the wheel 38A rolls along the drive axis $A_D$. In some constructions, the fork 58 is substantially free to rotate (about the vertical axis $A_V$) relative to the arm 34 via the swivel mount 42 so that the wheel assembly 38 is substantially unrestricted from automatically rotating to the angular position of least rolling resistance (which is with the wheel 38A aligned with the vehicle drive axis $A_D$). Alternately, the vehicle 10 may be driven along any non-neutral drive axis as long as the output of the angle box 46 can be compared to a direction of travel (e.g., a known steering angle that determines a non-neutral drive axis).

Figure 4:
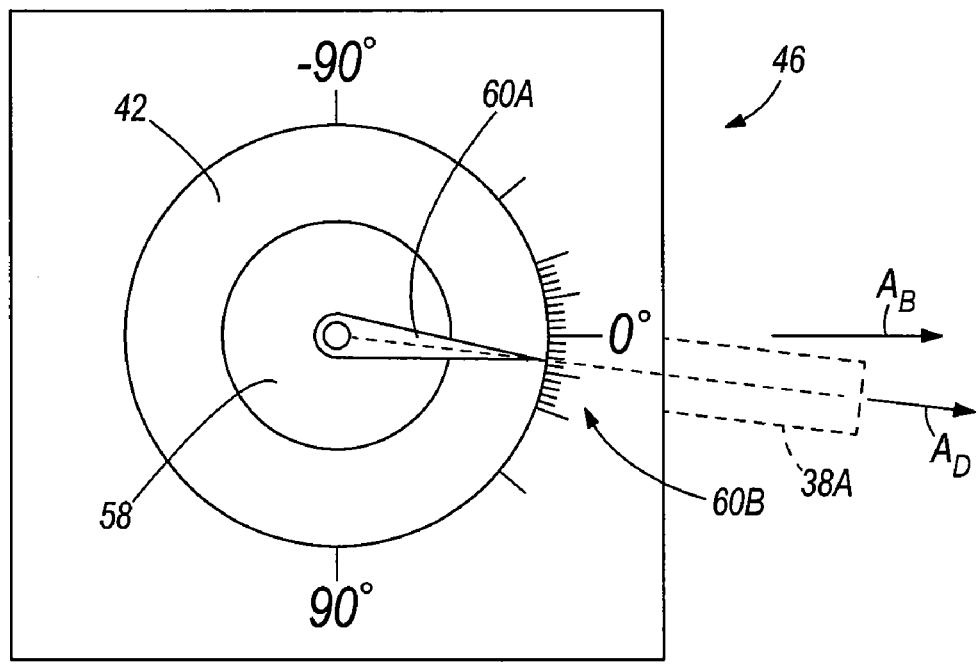
FIG. 4 is a top view of the angle box of FIG. 3, the angle box indicating a non-zero offset between vehicle body and vehicle drive axes.

In the simplest form, the top surface of the fork 58 may extend through the swivel mount 42 and be visible through the top of the angle box 46 as shown in FIGS. 3 and 4. An indicator such as a pointer 60A is provided on the top surface of the fork 58 and is fixed relative to the fork 58. An angular dial 60B is provided on a top surface of the angle box 46 immediately surrounding the swivel mount 42 and the fork 58. The indicator is configured to indicate an angle of zero degrees when the wheel 38A of the alignment device 30 rolls in a direction that is parallel to the arm 34 (i.e., along the body axis $A_B$). In the illustrated construction, the pointer 60A points to zero degrees on the dial 60B. It should be noted that the pointer 60A and the dial 60B can be reversed, so that the pointer 60A is fixed relative to the angle box 46 and the arm 34, and the dial 60B is provided on or with the fork 58.

After the wheel assembly 38 has self-centered itself, the rolling direction of the wheel 38A stays substantially parallel with the drive axis $A_D$. Thus, if the angle box 46 indicates an angle of zero during sustained movement of the vehicle 10 along the drive axis $A_D$, then the body axis $A_B$ is substantially coaxial with the drive axis $A_D$. This is shown in FIG. 3. However, if the wheel 38A centers itself to roll along an axis not parallel with the body axis $A_B$, then the angle box 46 will indicate a non-zero offset angle indicative of the actual offset angle between the drive axis $A_D$ and the body axis $A_B$. This is shown in FIG. 4.

In a manual system, an operator observes the offset angle indicated by the angle box 46 and orients one or more of the body-mounted devices 26 relative to the body 14 to account for the offset angle, aligning or otherwise orienting the one or more body-mounted devices 26 relative to the drive axis $A_D$. When the alignment device 30 is used and the method is carried out by driving the vehicle 10 along the neutral or central drive axis $A_D$, the body-mounted devices 26 are positioned to a fixed position in the case of a fixed-position device or to a neutral or "home" position in the case of a device that moves with the direction of travel of the vehicle 10 to follow the drive axis $A_D$. If any of the body-mounted devices 26 are configured to move back and forth during operation to follow changes in the drive axis $A_D$ related to changes in a steering angle, the operator may perform additional checks, for example, at the limit positions of the movable body-mounted devices 26.

Figure 5:
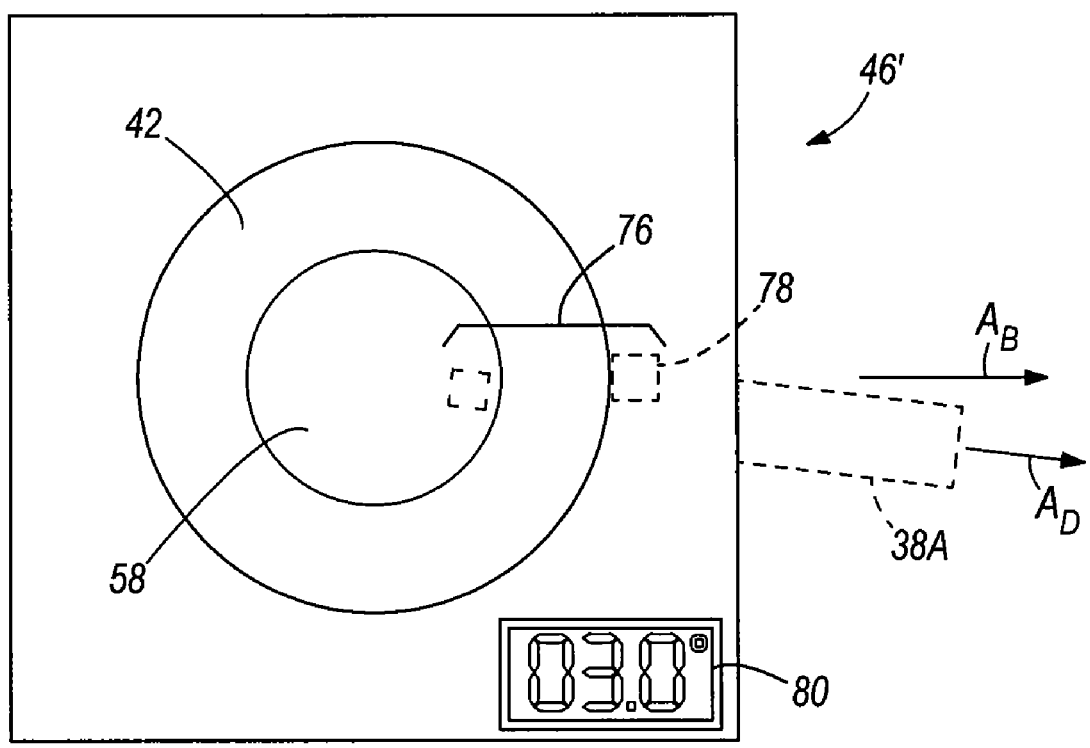
FIG. 5 is a top view of an alternate angle box for the vehicle drive axis alignment device of FIG. 1, the angle box including an electronic display indicating a non-zero offset between vehicle body and vehicle drive axes.

In the alternate construction of FIG. 5, the angle box 46' includes an electronic sensor arrangement 76 including one or more electronic sensors 78 (e.g., magnetic, optical, etc.) that sense the relative angular orientation between the fork 58 and the arm 34. The sensor(s) 78 are calibrated so that an output of zero degrees is obtained when the wheel 38A rolls parallel to the arm 34. An electronic display 80 (e.g., LCD or other conventional type of display) can be provided on or adjacent the arm 34 or the angle box 46. Alternately, the electronic display 80 can be relocated as a remote display, and the sensor(s) 78 within the angle box 46' sends a signal through one or more wires or wirelessly to the remote electronic display. The remote electronic display can be incorporated into a computer or may be another type of remote display that is separate from the angle box 46 and the arm 34.

Furthermore, it is also possible to automate all or part of the system and/or method. Such automation may include the electronic sensors 78 and/or systems to detect the angle between the wheel 38A and the body axis $A_B$ and actuate positioning means (electromechanical, hydraulic, etc.) for automatically positioning one or more of the body-mounted devices 26 relative to the body 14 to counteract the offset angle between the body axis $A_B$ and the drive axis $A_D$. An electronic system may also include a controller such as a micro-processor that is configured to average data output from an angular sensor of the angle box 46 in the event that the sensor 78 detects any amount of variation in the angle between the fork 58 and the arm 34 as the wheel 38A rolls.

In one construction, one of the body-mounted devices 26 is a radar (radio) or lidar (light) sensor for the vehicle 10 (a first automobile) that is part of a safety system configured to detect an object, such as a second automobile, in front of the vehicle 10 and take corresponding action. The sensor is configured to monitor a distance to the second automobile and also a change in that distance relative to time (relative velocity), and furthermore a rate of change in the relative velocity (relative acceleration). The sensor may be coupled to a controller such as a micro-processor that uses algorithms to determine if an unsafe condition is occurring, such as the second automobile coming to a panic stop in front of the vehicle 10. The controller can then take a responsive action such as alerting the driver of the vehicle 10 or activating the brakes of the vehicle 10, for example. The orientation of the radar or lidar sensor relative to the body 14 is configured to be dynamically responsive to changes in the drive axis $A_D$ to maintain its alignment therewith during travel of the vehicle 10 along a non-neutral drive axis. This may be accomplished by monitoring and responding to changes in a steering angle that determines the drive axis $A_D$. Precise alignment of the sensor with the drive axis $A_D$ at all times is important for maintaining proper function of the safety system over its range of operating conditions.

An angular offset between the body axis $A_B$ and the drive axis $A_D$ (e.g., 3 degrees) that is relatively common in production automobiles and seemingly insignificant, may easily impair the operation of a safety system as described above. Therefore, while the angular position of the body 14 relative to the drive axis $A_D$ does not necessarily need to be corrected, an apparatus and method are provided by the invention to establish alignment between the body-mounted devices 26 and the drive axis $A_D$ by measuring the offset angle and positioning the body-mounted devices 26 (e.g., sensor of the safety system) on the body 14 to counteract the measured offset angle between and the body axis $A_B$ and the drive axis $A_D$. Thus, the body-mounted devices 26 can be reliably aligned with the drive axis $A_D$ regardless of the offset angle between the body axis $A_B$ and the drive axis $A_D$.

It should be noted that the drive axis alignment device 30 and method described above and illustrated in the figures may be used to position or align body-mounted devices 70, 72 relative to the drive axis $A_D$, without necessarily aligning the body-mounted devices 70, 72 coaxially with the drive axis $A_D$ (i.e., pointing directly forward or rearward coaxial with the drive axis $A_D$). For example, a camera or sensor 70 mounted on the side of the vehicle 10 may need to be positioned perpendicular to the drive axis $A_D$ to function properly or optimally. The alignment device 30 and the method of use described above are still effective as described above, but the measured offset angle between the body axis $A_B$ and the drive axis $A_D$ can be used to position or adjust the body-mounted devices 70, 72 at angles other than zero and 180 degrees (e.g., 45, 90, or 135 degrees) relative to the drive axis $A_D$.

The invention provides, among other things, an apparatus and method for aligning body-mounted devices with a vehicle's drive axis. The apparatus is compact and portable such that the apparatus may be used and the method carried out in a cost-effective manner at virtually any location. Various features of the invention are set forth in the claims.

The invention claimed is:

1. An apparatus for measuring an angular offset between a vehicle body axis and a vehicle drive axis, the apparatus comprising:
    an arm having a mounting portion for mounting to a vehicle such that the arm is aligned with the vehicle body axis defined by a body of the vehicle;
    a wheel support member coupled to the arm for rotation relative to the arm;
    a wheel rotatably supported by the wheel support member and configured to roll on a ground surface, such that the wheel and the wheel support member are configured to self-align with the vehicle drive axis when the arm is mounted to the vehicle and the vehicle is driven on the ground surface; and
    an indicator that displays the angular offset between the wheel support member and the arm, which is indicative of the angular offset between the vehicle body axis and the vehicle drive axis.

2. The apparatus of claim 1, wherein the wheel support member is coupled to the arm with a swivel mount that allows substantially free rotation of the wheel support member relative to the arm.

3. The apparatus of claim 1, wherein the arm includes an alignment aide to assist in aligning the arm to the vehicle.

4. The apparatus of claim 3, wherein the alignment aide includes at least one level.

5. The apparatus of claim 1, wherein the indicator includes a pointer and a dial.

6. The apparatus of claim 5, wherein the dial is fixed with respect to the arm and the pointer is fixed relative to the wheel support member.

7. The apparatus of claim 1, wherein the indicator includes an electronic display.

8. The apparatus of claim 1, wherein the indicator is operable to send a signal indicative of the angular offset between the vehicle body axis and the vehicle drive axis to a remote display.

9. A method of measuring an angular offset between a vehicle body axis and a vehicle drive axis, the method comprising:
    coupling an arm to a vehicle such that the arm is aligned with the vehicle body axis defined by a body of the vehicle;
    supporting a wheel support member with the arm for rotation relative to the arm;
    rotatably supporting a wheel with the wheel support member, with the wheel in contact with a ground surface;
    driving the vehicle on the ground surface along the vehicle drive axis, the wheel and the wheel support member self-aligning with the vehicle drive axis; and
    displaying the angular offset between the wheel support member and the arm, which is indicative of the angular offset between the vehicle body axis and the vehicle drive axis, with an indicator.

10. The method of claim 9, further comprising providing a device mounted on the body, and adjusting the device relative to the body based on the displayed angular offset so that the device is oriented relative to the vehicle drive axis.

11. The method of claim 10, wherein the device is aligned with the vehicle drive axis.

12. The method of claim 10, wherein the device is oriented at a non-zero angle relative to the vehicle drive axis.

13. The method of claim 10, wherein the device is one of a radar sensor, a lidar sensor, a camera, and a headlight.

14. The method of claim 9, wherein displaying the angular offset between the wheel support member and the arm includes providing a pointer and a dial, one of which is fixed relative to the wheel support member and the other of which is fixed relative to the arm.

15. The method of claim 14, wherein displaying the angular offset between the wheel support member and the arm includes pointing the pointer at the dial.

16. The method of claim 9, wherein displaying the angular offset between the wheel support member and the arm includes displaying a number on an electronic display.

17. The method of claim 16, wherein the electronic display is a remote electronic display and the indicator sends a signal indicative of the angular offset between the vehicle body axis and the vehicle drive axis to the remote electronic display.

* * * * *